United States Patent [19]
Tripp

[11] 3,840,724
[45] Oct. 8, 1974

[54] SCALAR MULTIPLIER

[75] Inventor: Robert W. Tripp, Tuckahoe, N.Y.

[73] Assignee: Inductosyn Corporation, Valhalla, N.Y.

[22] Filed: Apr. 25, 1973

[21] Appl. No.: 354,264

[52] U.S. Cl. ... 235/92 DM, 235/92 CV, 235/92 PL, 235/92 R, 328/48
[51] Int. Cl. .......................................... H03k 21/30
[58] Field of Search ....... 235/92 PL, 92 CV, 92 PE, 235/92 CC, 92 DN, 92 DM; 307/225; 328/48

[56] References Cited
UNITED STATES PATENTS
3,601,585  8/1971  Paulsen ........................ 235/92 DN
3,764,781  10/1973  Kreithen et al. ................ 235/92 PL Primary Examiner—Gareth D. Shaw
Assistant Examiner—Joseph M. Thesz, Jr.
Attorney, Agent, or Firm—William E. Beatty; John L. Downing

[57] ABSTRACT

Disclosed is a scalar multiplier which is responsive to input pulses representing a measurement in a first measurement system and converts such pulses into output pulses representing an equivalent measurement in a second measurement system, this second measurement system having a constant relationship to said first measurement system. The scalar, or converter as it may be called, typically multiplies or divides the input pulses received which represent a unit of a first measurement system by a constant to obtain the number of output pulses which represent the equivalent in the second measurement system. The scalar multiplier insures that the output is correct to within plus or minus one-half bit (input pulse). Conversion in the disclosed scalar multiplier offers a bilateral operation, that is, it may be either from the first measuring system to the second measuring system or from the second measuring system to the first measuring system, in effect multiplying, or dividing, at option.

8 Claims, 3 Drawing Figures

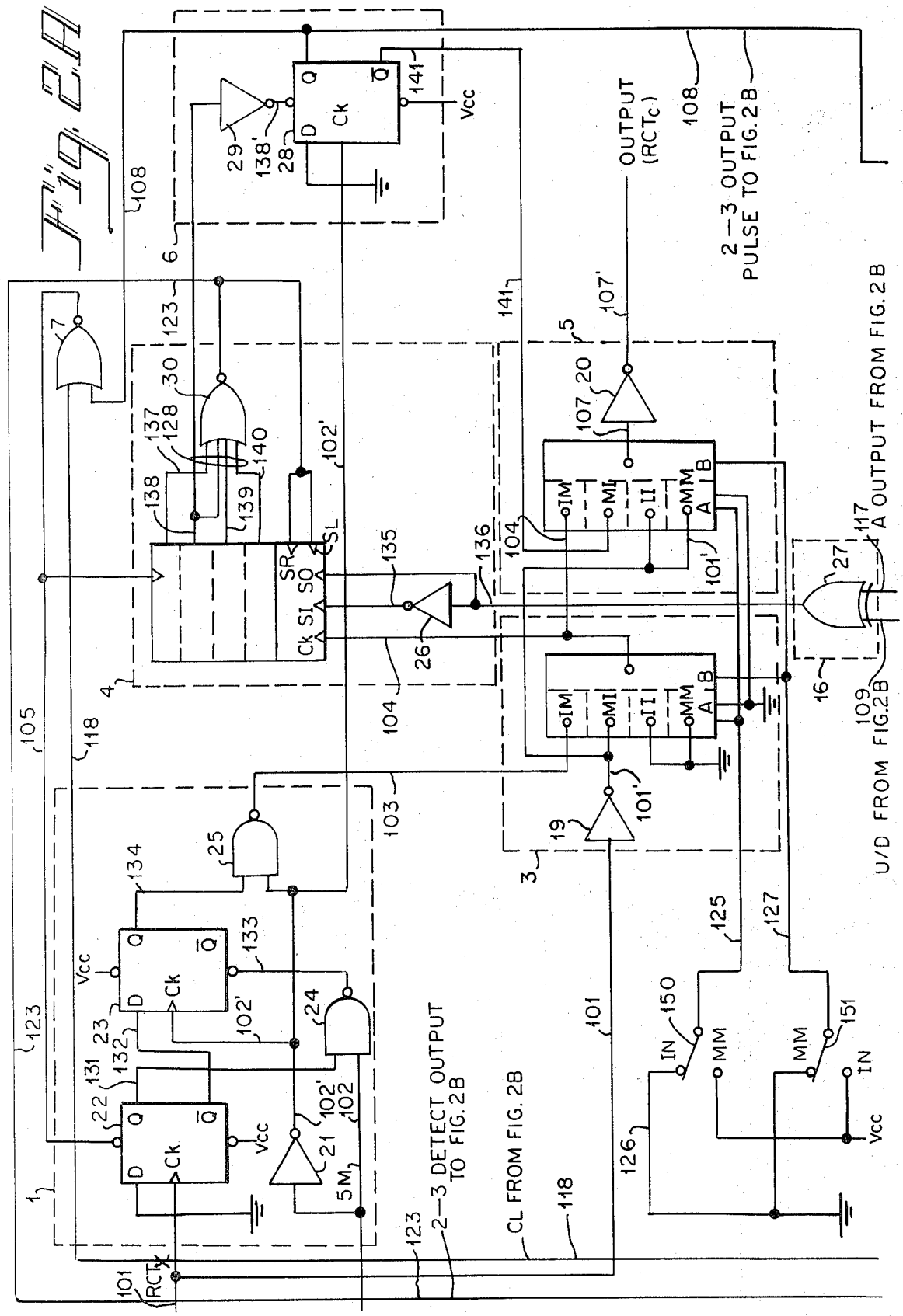

SCALAR MULTIPLIER

BACKGROUND OF THE INVENTION

The present invention relates to a scalar multiplier or converter and more particularly to scalars for converting the measurement taken in a first measurement system to the equivalent measurement in a different system.

SUMMARY OF THE INVENTION

The present invention is a scalar multiplier/divider system for converting digital values, represented by pulses, in a first measuring system into equivalent digital values represented by pulses in a second measuring system.

The invention may be utilized generally to convert between any two systems of measurement having a constant relation to each other, such as imperial to metric dimension.

The invention will be specifically described in regard to converting inches to centimeters or, alternatively, centimeters to inches. Since there are 2.54 centimeters per inch, the conversion factor of 2.54 is used and this, of course, is scaled upwardly when converting from inches to centimeters and scaled downwardly when converting centimeters to inches.

Considering a specific example in which input pulses are used to represent an imperial dimension, an output of 127 "centimeter" pulses are generated for each group of 50 inch input pulses, and vice versa.

In accordance with the present invention, and in order to obtain an accuracy of 100 percent for each dimension or multiple thereof and plus or minus one half of the last resolution bit or pulse for inputs which are fractions of an inch or unequal multiples of an inch, the 50 inch pulse group is subdivided into four segments of 13, 13, 11 and 13 pulses, totalling 50 pulses. Alternatively, the segments may be subdivided to register 13, 11, 13 and 13 pulses. The pulses of each of the four segments are counted by an "11 or 13" segment pulse counter which counts either 11 or 13 pulses depending on the number of counts in each segment and is then reset.

It will be noted from the following Table I, or the alternate Table II, that when converting from inch input pulses to centimeter output pulses, the output alternatives between three pulses per each input pulse and two pulses per inch input pulse. Also, each segment starts and ends with three pulses per each input pulse thus resulting in an output of 127 centimeter pulses for each group of 50 inch pulses. In the alternate mode of converting metric to inch, the same segment arrangement is used, but reversing the process.

It should also be noted that the least increment, or single pulse, can represent in the "inch" column optionally 1 inch or 0.1 inch, etc., and in the preferred embodiment 0.0001 inch. Correspondingly, the pulses shown in the cm column could represent 3cm or 0.3cm, etc., and in the preferred embodiment 0.0003cm.

Each input pulse opens an input pulse gate to transmit clock pulses to the output circuit and to a "2 or 3" shift register which also acts as a clock pulse counter to alternately count 2 or 3 pulses within each segment. When, for example, three input pulses have been registered by the 2–3 shift register, the latter is reset, the input gate is closed, and the 11—13 counter is incremented to count the 11 or 13 pulses in a particular segment. When the appropriate count, i.e., 13, is reached, the segment counter is incremented to count the segments and 11 13 counter is reset. The pattern of count by the 2–3 shift register will be understood on reference to the "cm output" columns of Table I or Table II.

An "up/down" circuit determines the direction of count, depending on whether the inch pulses are being counted up or counted down.

The decision to count either two or three pulses in the 2–3 shift register is dependent on the state of the 11–13 counter and the state of the up/down circuit. When the up/down circuit is in a count-up state and the 11 13 counter registers zero or an even number, the 2–3 shift register will count to three before resetting. However, when the 11–13 counter registers an odd number, the 2–3 shift register will count to zero before resetting. On the other hand, when the up/down circuit is in a count-down state and the 11–13 counter registers an odd number, the 2–3 shift register will count to three, and when the 11–13 counter registers an even number the 2–3 shift register will count to two.

When the system is in a count-up state, an "11–13 Detect" circuit under control of the segment counter will determine when the 11–13 counter has reached its prescribed count, and when this occurs the 11—13 counter will be reset and the segment counter will be incremented. On the other hand, when the system is in a count-down state, a "Zero Detect" circuit will detect when the 11–13 counter has reached zero, and when this occurs, the segment counter will be decremented and a load circuit will load the 11–13 counter with 11 or 13 pulses, depending on the count registered by the segment counter.

TABLE I

| Segments | | | | | | | |
|---|---|---|---|---|---|---|---|
| 13 | | 13 | | 11 | | 13 | |
| Inch Input | cm Output | Inch Input | cm Output | Inch Input | cm Output | Inch Input | cm Output |
| 1 | 3 | 14 | 36 | 27 | 69 | 38 | 97 |
| 2 | 5 | 15 | 38 | 28 | 71 | 39 | 99 |
| 3 | 8 | 16 | 41 | 29 | 74 | 40 | 102 |
| 4 | 10 | 17 | 43 | 30 | 76 | 41 | 104 |
| 5 | 13 | 18 | 46 | 31 | 79 | 42 | 107 |
| 6 | 15 | 19 | 48 | 32 | 81 | 43 | 109 |
| 7 | 18 | 20 | 51 | 33 | 84 | 44 | 112 |
| 8 | 20 | 21 | 53 | 34 | 86 | 45 | 114 |
| 9 | 23 | 22 | 56 | 35 | 89 | 46 | 117 |
| 10 | 25 | 23 | 58 | 36 | 91 | 47 | 119 |
| 11 | 28 | 24 | 61 | 37 | 94 | 48 | 122 |
| 12 | 30 | 25 | 63 | | | 49 | 124 |
| 13 | 33 | 26 | 66 | | | 50 | 127 |

TABLE II

| Segments | | | | | | | |
|---|---|---|---|---|---|---|---|
| 13 | | 11 | | 13 | | 13 | |
| Inch Input | cm Output | Inch Input | cm Output | Inch Input | cm Output | Inch Input | cm Output |
| 1 | 3 | 14 | 36 | 25 | 64 | 38 | 97 |
| 2 | 5 | 15 | 38 | 26 | 66 | 39 | 99 |
| 3 | 8 | 16 | 41 | 27 | 69 | 40 | 102 |
| 4 | 10 | 17 | 43 | 28 | 71 | 41 | 104 |
| 5 | 13 | 18 | 46 | 29 | 74 | 42 | 107 |
| 6 | 15 | 19 | 48 | 30 | 76 | 43 | 109 |
| 7 | 18 | 20 | 51 | 31 | 79 | 44 | 112 |
| 8 | 20 | 21 | 53 | 32 | 81 | 45 | 114 |
| 9 | 23 | 22 | 56 | 33 | 84 | 46 | 117 |

TABLE II-Continued

| Segments | | | | | | | |
|---|---|---|---|---|---|---|---|
| 13 | | 11 | | 13 | | 13 | |
| Inch Input | cm Output | Inch Input | cm Output | Inch Input | cm Output | Inch Input | cm Output |
| 10 | 25 | 23 | 58 | 34 | 86 | 47 | 119 |
| 11 | 28 | 24 | 61 | 35 | 89 | 48 | 122 |
| 12 | 30 | | | 36 | 91 | 49 | 124 |
| 13 | 33 | | | 37 | 94 | 50 | 127 |

BRIEF DESCRIPTION OF THE DRAWINGS

FIG. 2A is a schematic diagram of one-inch of the circuit of FIG. 1.

DETAILED DESCRIPTION OF THE INVENTION

The particular conversion process, inches to metric, metric to inches, inches to inches, or metric to metric, is accomplished by the switching actions of the multiplex units 3 and 5 (shown in greater detail on FIG. 2A). For purposes of clarity, in block diagram FIG. 1, the multiplex unit is shown schematically as two ganged four position switches (3 and 5) to illustrate the logic for inch/metric, metric/inch, inch/inch, and metric/metric modes. The four switch positions of "IM", "MI", "II", and "MM", respectively, are controlled from lines 125 and 127 via the logic of the multiplex unit.

Figure 1:
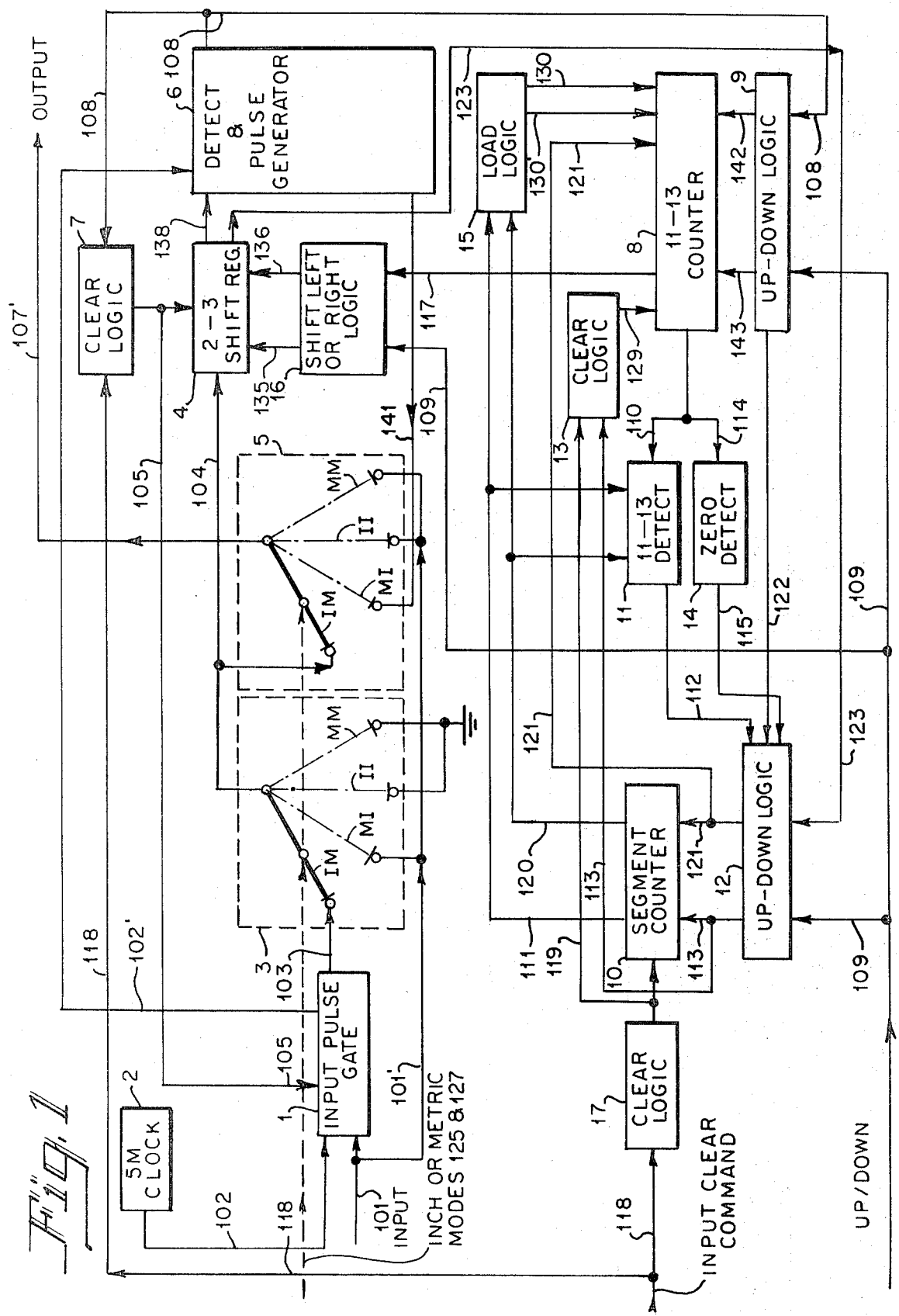
FIG. 1 depicts a block diagram representation of a scalar multiplier converter in accordance with the present invention with multiplex switch shown in the inch to metric mode.

Although the four systems above are described fully in the description of FIG. 2A to follow, it can be seen in FIG. 1 that in the inch/metric mode (multiplex "switches" at "IM") an input pulse on 101 gates the clock pulses 102 in input gate 1 and output 103 flows directly to the "2–3" shift register on line 104 via mutliplex switch 3. These pulses also are directed to the output 107′ via multiplex switch 5. When 2 or 3 pulses, as determined by shift logic 16, have been generated, input gate 1 is turned off via a command from detect & pulse generator 6 via line 108, clear logic 7 and line 105.

For metric/inch mode (switches at "MI"), the input pulses on 101 bypass the input gate 1 to be switched to 104 and to "2–3" shift register 4. (Line 102′ from input pulse gate 1 is merely 102 clock pulse inverted). The "2–3" shift register 4 will have an output 138 when the algebraic sum of the pulses is 2 or 3 as required. This is controlled by the up/down signal on line 109, and logic input on line 117, through the shift left or right logic 16. Then this output 138, via detect & pulse generator 6, produces one output pulse on line 107′ via line 141 and multiplex "switch" 5. At this time, as in the inch/metric mode, clear logic 7 clears "2–3" shift register 4. Note that the state of line 117 can only change upon the generation of an output on line 107′.

For inch/inch and metric/metric (multiplex switches on "II" or "MM", the input pulses on line 101 are directed, without multiplication or division, to output line 107′.

In FIG. 1, the scalar multiplier converter system is shown in the form of an inch/metric converter, which comprises an input pulse gate 1 so that 5 megahertz pulses appear on line 103 which have been generated into gate 1 by clock 2 along line 102. Each pulse output on line 107′ (as a metric pulse) is counted by "2–3" shift register 4 while up/down line 109 is in the up position and counter 8 at zero. When 2 or 3 pulses have been outputed, shift register 4 causes detect generator 6 to activate clear logic 7 to inhibit pulse gate 1 from allowing further 5 MHz pulses to be outputed. Detect generator 6 also causes a pulse to be counted through up/down logic 9 into counter 8. The state of up/down line 109 is the determining factor as to whether counter 8 counts up or counts down. The decision to count either two 5 MHz pulses or three 5 MHz pulses in shift register 4 is dependent upon the state of counter 8 and the state of up/down line 109. When up/down line 109 is in the count-up state and counter 8 is on an even number count, that is 0, 2, 4, ..., shift register 4 will count three 5 MHz pulses before resetting. When up/down line 109 is in the countup state and counter 8 is on an odd number count, that is 1, 3, 5, ..., shift register 4 will count two 5 MHz pulses before resetting. Additionally, when the up/down line 109 is in the count-down state and counter 8 is on an even number count, counter 4 will count two 5 MHz pulses before resetting, and when the up/down line 109 is in the count-down state and counter 8 is on an odd number count, counter 4 will count three 5 MHz pulses before resetting. When Segment Counter 10 is in the zero state, and when a total of 13 counts have been accumulated in the "11–13" counter 8, the "11–13" detect 11 will signal 13 counts by energizing up/down logic 12 through line 112, which, in turn, will cause Segment Counter 10 to be incremented through line 113. Line 113, simultaneously, activates clear logic 13, which, in turn, clears counter 8 through line 129. When Segment Counter 10 accumulates a total of two counts or any multiple of 4N + 2 counts, wherein N is any integer, i.e., 0, 1, 2, ..., the detect logic 11, from line 110, will allow only eleven counts to be accumulated in counter 8 before Segment Counter 10 is incremented and resets counter 8 to zero through clear logic 13, line 113, and line 129. In a similar manner, if counter 8 is at zero and up/down 109 is in the down state, the next count from 2-3 detect 6 along line 108 will, through up/down logic 9 and counter 8, cause zero detect 14 to decrement segment counter 10 along line 115 and through up/down logic 12. As a result, the output of a load logic 15 will load counter 8 with the number 11 or 13, depending upon the number in counter 10 prior to the decrement of Segment Counter 10 through line 121. If Segment Counter 10 is at the count three or any multiple of 4N + 3 counts, wherein N is any integer, i.e., 0, 1, 2, 3, ..., the counter 8 will be loaded to eleven counts through line 120, load logic 15 and line 130. For all other values in counter 10, counter 8 will be loaded in the same manner to thirteen counts.

Figure 2B:
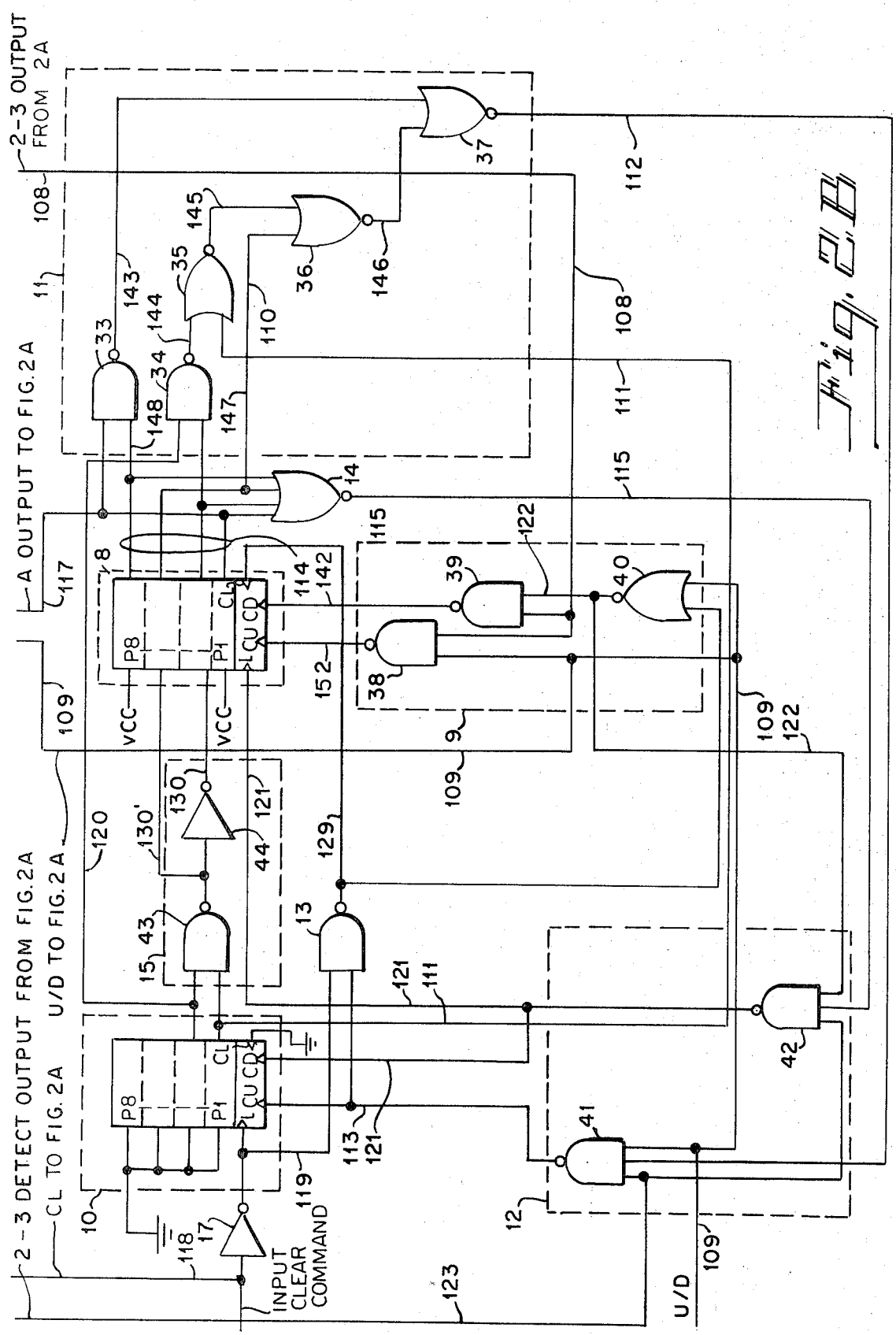
FIG. 2B is a schematic diagram of the other half of the circuit of FIG. 1.

FIGS. 2A and 2B are a composite schematic diagram of the circuitry of the scalar multiplier/divider system of the present invention as shown in the block diagram of FIG. 1.

The particular conversion process shown, i.e. inches to metric, is dependent upon the state of input mode line 125 and system mode line 127, both of which, in combination, control the states of multiplex 3 and 5.

The state of input mode line 125 is determined by the transducer type employed, i.e., inch or metric, as indicated by the position of strap 150. The state of the system mode line 127 is determined by the type of output desired, as indicated by the position of strap 151;

In the inch to metric mode, as shown, each output pulse appearing on line 107' originates as a 5 megahertz pulse on line 101 and is transmitted through the elements and lines in the following consecutive order: input pulse gate 1, line 103, multiplex 3, line 104, multiplex 5, line 107, inverter 20.

The resetting of the apparatus of the present invention is accomplished by clear logics 7, 13, and 17 which reset shift register 4 and counters 8 and 10 to zero and inhibit pulses through input gate 1.

The "multiplex" unit is a well known integrated circuit module typical to type SN74153 manufactured by Texas Instruments, Inc. This unit is an electronic switch equivalent to a two pole four position relay. Its control is responsive to the four states possible of two logic lines each having a "high" or "low" state. In each of the four states, one of four inputs is connected to one output. Since Texas Instruments SN74152 is a dual unit, and illustrated as multiplex 3 and 5, two sets of four inputs are connected to two multiplex output lines 104 and 107 as follows:

| Mode | Control 125 | Control 127 | Output (3) Line 104 | Output (5) Line 107 |
|---|---|---|---|---|
| IM | Low | Low | 103 | 104 |
| MI | High | High | 101' | 141 |
| II | Low | High | Ground | 101' |
| MM | High | Low | Ground | 101' |

In the inch to metric mode, the input mode line 125 is switched (150) to low (for "inch" input pulses) and system mode line 127 is switched (151) to low (for "metric" output pulses). This results in line 104 being internally connected to line 103 in multiplex 3 and line 104 being integrally connected to output line 107' in multiplex 5.

A source of clock pulses (not shown in FIG. 2A and 2B) generates clock pulses on line 102. When an input pulse appears on line 101, the rising edge toggles flip-flop 22, causing the output line 131 to go low and line 132 to go high. This enables flip-flop 23 through line 133 and NAND gate 24 which, therefore, permits the rising edge of the clock pulses on line 102', which are derived from line 102 through inverter 21, to toggle the output line 134 of flip-flop 23 high. Line 134 enables NAND gate 25 and thereby permits the clock pulses appearing on 102' to appear on line 103 in the inverted form. These pulses appear on line 104 where each pulse is counted by counter 4. Each pulse further appears on line 107' after passing through inverter 20. Therefore, each output pulse appearing on line 107' is counted by shift register 4.

When up/down line 109 is high (representing an up count) and line 117 from counter 8 is low (representing an even number), the output of EXCLUSIVE OR gate 27 line 136 is high and the output of inverter 26 line 135 is low. Lines 135 and 136 in combination cause 2–3 shift register 4 to shift right. When shift register 4 is at zero, then lines 137, 138, 139 and 140 are low, which cause the output line 123 of NOR gate 30 to be high, thereby putting a high into the serial input of shift register 4. The rising edge of the first pulse appearing on line 104 causes the high on line 123 to be shifted to line 140. The high on line 140 causes the output line 123 of NOR gate 130 to go low, thereby preventing further highs from being entered into shift register 4. The rising edge of the second and third pulses appearing on line 104 causes the high from line 140 to be shifted to lines 139 and 138, respectively. When the high reaches line 138, it causes the output line 138' of inverter 29 to go low which forces the output line 108 of flip-flop 28 to go high. This causes the output line 105 of NOR gate 7 to go low which clears shift register 4 to zero and forces output line 131 of flip-flop 22 to go high. The next pulse appearing on line 102 causes the output line 133 of NAND gate 24 to go low. This forces line 134 of flip-flop 23 to go low, thereby inhibiting further pulses from being transmitted to output line 103 of NAND gate 25. The clearing of shift register 4 causes line 138 to go low which thereby causes the output of inverter 29, line 138', to go high. The rising edge of the next clock pulse appearing on line 102' causes the output line 108 of flip-flop 28 to go low. When the up/down line 109 is low and line 117 is low, EXCLUSIVE OR gate 27 and inverter 26 cause lines 135 to be high and 136 to be low. Lines 135 and 136 in combination cause 2–3 shift register 4 to shift left. In a manner similar to the shift right condition, described above, when shift register 4 is at zero, serial input line 123 is high. The rising edge of the first pulse appearing on line 104 causes the high on line 123 to be shifted to line 137. The high on line 137 causes the output line 123 of NOR gate 30 to go low, thereby preventing further highs from being entered into shift register 4. The rising edge of the second pulse appearing on line 104 cause the hgih from line 137 to be shifted to line 138. As described above, when the high reaches line 138, it causes output line 138' of inverter 29 to go low which forces the output line 108 of flip-flop 28 to go high. This causes the output line 105 of NOR gate 7 to go low which clears shift register 4 to zero and forces output line 131 of flip-flop 22 to go high.

The next clock pulse appearing on line 102 causes output line 133 of NAND gate 24 to go low. This forces the output line 134 of flip-flop 23 to go low thereby inhibiting further pulses from being transmitted to output line 103 of NAND gate 25. The clearing of shift register 4 causes line 138 to go low which thereby causes the output of inverter 29, line 138', to go high. The rising edge of the next clock pulse appearing on 102' causes the putout line 108 of flip-flop 28 to go low. A pulse is thereby generated during either the shift right or shift left state, described above, on line 108.

When up/down line 109 is high, counter 8 is at zero and counter 10 is at zero, the output of NOR gate 40, line 122, is low which forces the output of NAND gate 39, line 142, high. Since up/down line 109 is high, NAND gate 38 is enabled. Therefore, when the pulse on line 108 is generated, it appears in its inverted form at the output of NAND gate 38, line 152, which is the increment input to counter 8. This causes counter 8 to count up to the number 1. The next pulse generated on line 108 under the conditions described above will increment counter 8 one count to the number 2. In the same manner, when up/down line 109 is low, the output of NAND gate 38, line 152, is forced high and the output of NAND gate 41, line 113, is forced high. Further, since clear line 118 is low, the output of inverter 17, line 119, is high and this, in combination with line 113, forces the output of NAND gate 13, line 129 to go low. Lines 129 and up/down line 109 in combination cause the output of NOR gate 41 line 122 to go high thereby enabling NAND gate 39. The next pulse generated on line 108 will appear at the output of NAND gate 39, line 142, which is the decrement input to counter 8, in its inverted form and thereby cause counter 8 to be decremented by one count back to the number 1. When counter 8 has accumulated 13 counts, lines 148, 110 and 117 are high and line 119 is low. Lines 117 and 148 in combination cause the output of NAND gate 33, line 143, to go low. The high on line 110 forces the output of NOR gate 36, line 146, low. Lines 143 and 146, in combination, force the output of NOR gate 37, line 112, high. When shift register 4 is at zero, line 123 is high as described above. Lines 123, 108 and 112, in combination, force the output of NAND gate 41, line 113, low, which, in turn, forces the output of NAND gate 13, line 129, which is the clear input of counter 8, high. This results in the clearing of counter 8 and as a result, lines 110, 117 and 148 are set to zero. This results in the output of NOR gate 37, line 112, going low, which forces the output of NAND gate 41, line 113, high. The rising edge of this pulse causes counter 10 to increment one count. Lines 113 and 119, in combination, force the output of NAND 13, line 129, low, thereby removing the clear command from counter 8. Counter 8 is now ready to repeat a new cycle of counts as described above. When counter 10 is at the number 2, line 120 is high and line 111 is low. When counter 8 accumulates eleven counts, then lines 148, 119 and 117 are high and line 110 is low. Lines 119 and 120 combine to foce the output of NAND gate 34, line 144, low, which, in combination with line 111, force the output of NOR gate 35, line 145, high. This forces the output of NOR gate 36, line 146, low. Lines 148 and 117, in combination, force the output of NAND gate 33, line 143, low. Lines 146 and 143, in combination, force the output of NOR gate 37, line 112, high, which results in the incrementing of counter 10 and clearing of counter 8, as described above. Hence, when counter 10 is in the two state or any combination of 4N + 2, wherein N is any integer, i.e., 0, 1, 2, 3, ..., counter 8 will count to the number 11 before a pulse is generated on line 112 which results in the incrementing of counter 10 and the clearing of counter 8 For all other states of counter 10, counter 8 will count to the number 13 before the pulse is generated on line 112 and counter 10 is incremented and counter is cleared. This is shown in Tables I and II, infra.

When counter 10 is at zero and counter 8 is at the number 1 and the up/down 109 is low, a pulse on line 108 will result in counter 8 being decremented by one count, as described above to the number 0. This results in output lines of counter 8, 117, 119, 110 and 148 going to zero. These lines called at 114 result in the output of NOR gate 14, line 115, going high. As previously described, shift register 4 is at zero and line 123 is high. Since the up/down line 109 is low, the output of NAND gate 41, line 113, is high. This in combination with the high on line 119 as previously described force the output of NAND gate 13, line 129, low. This in combination with line 109 force the output of NOR gate 40, line 122, high. Lines 122, 115, and 123 in combination, force the output of NAND gate 42, line 121, low. This is the load input of counter 8 and decrement input of counter 10. In as much as counter 10 is at zero, lines 120 and 111 are at zero. Either line forces the output of NAND gate 43, line 130', high, which is the four bit preset input to counter 8. This high further forces the output of inverter 44, line 130, which is the two bit preset input to counter 8, low. Both the eight bit preset input, line 150, and the one bit preset input, line 151, to counter 8 are connected to a high. Hence, the low produced on line 121, as previously described causes counter 8 to be preset to the number 13. This results in the lines 114, 110 and 148 going high and line 119 going low. Any one of the high on the above-mentioned lines forces the output of NOR gate 14, line 115, low, which, in turn, forces the output of NAND gate 42, line 121, high. The rising edge of the high on line 121 causes counter 10 to decrement one count, to the number four and the resulting high on line 121 removes the load command to counter 8. When counter 10 is at the number three or any value of 4N + 3, wherein N is any integer, i.e., 0, 1, 2, 3,..., then lines 120 and 111 are both high. These two lines in combination force the output of NAND 43, line 130', low, which is the preset input to the four bit of counter 8. This low further forces the output of inverter 44, line 130, high, which is the preset input of the two bit for counter 8. In addition, the eight bit preset input line 150 and the one bit preset input line 151 are tied high. Therefore, when counter 8 is at the number one and up/down line 109 is low and a pulse appears on line 108, counter 10 will be decremented as previously described to the number 2 or 4N + 2, wherein N is any integer, i.e., 1, 2, 3, ..., and counter 8 will be preset to the number 11 due to the status of lines 130, 130', 150 and 151 as previously described. Therefore, when counter 10 is at the number 4N + 3, wherein N is any integer, i.e., 0, 1, 2, 3, ..., and counter 8 is at one and the up/down line is low, the next pulse generated on line 108 results in decrementing counter 10 by one and presetting counter 8 to the number 11. For all other values of counter 10 while having the same conditions described as above, counter 8 will be preset to the number 13.

The system as herein described is cleared by setting line 118 high. This results in the following sequence:

1. Forcing the output of NOR gate 7, line 105, low, which causes the output of flip-flop 22, line 131, to go high and line 132 to go low, the rising edge of the next clock pulse appearing on line 102' will cause the output of flip-flop 23, line 134, to go low, thereby inhibiting pulses from passing through NAND gate 25; further, line 105 is the clear input to shift register 4 and hence the low on this line clears shift register 4 at zero.

2. The output of inverter 17 is forced low, which is the load input of counter 10, in as much as all of the preset inputs to counter 10 are connected low, the counter 10 is preset to zero. Further, the low on line 119 forces the output of NAND gate 13, line 129, high, which is the clear input to counter 8. This results in counter 8 being set at zero.

In summary, an inch pulse appearing on line 101 causes either two or three metric pulses to be outputed on line 107'. The number of pulses, two or three, is dependent upon the state of the up/down line 109, the state of the counter 8 and the state of the counter 10. This results in a net production of 127 metric pulses for each 50 input inch pulses in a given direction, which pulse production results in the inch/metric conversion factor of 2.54.

In describing the same system being utilized to convert from metric to inch measurements, input mode line 125 is set high (Vcc). In addition, line 127 is set high. Lines 127 and 125 in combination cause the interconnection of lines 101 to 104 in multiplex 3 and lines 107' to 141 in multiplex 5. Therefore, each inch pulse generated on line 101 appears in its inverted form at the output of inverter 19, line 101', which is connected to line 104 through multiplex 3 as previously described. Each pulse appearing on line 104 causes shift register 4 to shift left or right one count in a manner similar to that described for the inch to metric conversion. When two or three pulses have been accumulated in shift register 4, the number of pulses being accumulated dependent upon the same conditions as outlined in the inch to metric conversion, line 138 will go high. This causes the output of inverter 29, line 138', to go low which, in turn, forces the outputs of flip-flop 28, line 108, high and line 141, low. This low is repeated on line 107 through multiplex 5 as previously described, which, in turn, causes the output of inverter 20, line 107', to go high. The high on line 108 causes shift register 4 to be cleared to zero as described in the inch/metric conversion. This results in line 138 going low, which forces the output of inverter 29, line 138', high. The rising edge of the next clock pulse on line 102' results in the outputs of flip-flop 28, line 108 going low and line 141 going high. The results of line 141 going high is that line 107' goes low through the path as previously described. Further, the result of line 108 going low is that a pulse has been generated on line 108, which in conjunction with the state of up/down line 109, is counted into counter 8 as described previously in the inch to metric conversion system. The inter-relationship between counter 8 and 10 is the same as that described for the inch to metric conversion. In a similar manner, the clear command on line 118 clears the system as described in the inch to metric conversion.

In summary, for each set of three or two metric pulses appearing on line 101, one inch pulse is generated on line 107'. This results in a net production of 50 inch pulses for each 127 metric pulses in a given direction, which pulse production results in the metric to inch conversion factor of 1/2.54.

In describing the system of the present invention being utilized to read direct inch to inch measurement, input mode line 125 is set low. In addition, line 127 is set high. This results in the output of NAND gate 32, line 127, being forced high. Lines 127 and 125 in combination cause the inter-connection of line 101 and 107'. Therefore, each inch pulse generated on line 101 appears in its inverted form at the output of inverter 19, line 101', which is interconnected to line 107 through multiplex 5 as first hereinbefore described. This inverted pulse is re-inverted by inverter 20 and appears as an output pulse on line 107'. When reading direct metric to metric the operation is the same as described above for inch to inch except line 125 is high and line 127 is low, allowing the input at 101 to pass directly to 107' via multiplex 5.

Thus, there has been described a scalar multiplier/divider that converts, for example, inches to metric, metric to inches, inches to inches and metric to metric by generating a net production of pulses equivalent to, for example, a standard conversion factor of 2.54. The present invention has been described with relationship to the linear conversion measurements of inches and metric. However, as is evident to those skilled in the art, the present invention is applicable to any conversion system having a constant relationship.

While the invention has been particularly shown and described with reference to a preferred embodiment thereof, it will be understood by those skilled in the art that the foregoing may be changed to utilize other gates, inverters and counters, etc. as well as other changes in form and details may be made therein without departing from the spirit and scope of the present invention. The invention is, therefore, to be limited only as indicated by the scope of the opened claims.

I claim:

1. A system for converting values between first and second measuring systems, having inputs of clock pulses and of data pulses, said data pulses being representative of one of said measuring systems, comprising output gating means for gating said clock pulses to represent the data of the other of said measuring systems, a first counter for counting pulses of said first system, a second counter for counting pulses of said second system, said output gating means being controlled by a selected count of said first counter, said selected count being determined by signals provided by said second counter and logic means for automatically varying the maximum count state of said second counter in accordance with a predetermined repetitive schedule.

2. A system according to claim 1 wherein said one of said measuring systems is in inch dimensions, and said other of said measuring systems is in metric dimensions.

3. A system according to claim 1 wherein said one of said measuring systems is in metric dimensions and said other of said measuring systems is in inch dimensions.

4. A system according to claim 1 wherein said second counter comprises a segment counter and a segment pulse counter for counting pulses in a said segment, and means controlled by said segment pulse counter for stepping said segment counter when said segment pulse counter registers a number of pulses determined by said segment counter.

5. A system according to claim 4 including means for selectively determining the count-up or count-down state of said first and second counters.

6. A system according to claim 5 including means for detecting a count determined by said segment counter and means for setting said segment pulse counter to zero and for incrementing said segment counter when said detected count occurs during said count-up state.

7. A system according to claim 5 including means for detecting a zero state of said segment pulse counter and means for loading said segment pulse counter to a count determined by said segment counter and for decrementing said segment counter when said zero state occurs during said count-down state.

8. A system according to claim 5 wherein said segment counter counts four segments of a group of 50 pulses, three of said segments consisting of 13 pulses and one of said segments consisting of 11 pulses as counted by said segment pulse counter, said selected count of said first counter being alternatively 2 or 3 pulses, each step of said segment pulse counter representing 2 or 3 completed counts of said first counter.

* * * * *